United States Patent
Choi et al.

(10) Patent No.: US 12,107,229 B2
(45) Date of Patent: Oct. 1, 2024

(54) MANUFACTURING METHOD OF LITHIUM SECONDARY BATTERY COMPRISING ADDITIONAL HEAT-TREATMENT PROCESS AND LITHIUM SECONDARY BATTERY MANUFACTURED BY THE SAME

(71) Applicant: LG Chem, Ltd., Seoul (KR)

(72) Inventors: Hyunjun Choi, Daejeon (KR); Youngdeok Kim, Daejeon (KR); Daesoo Kim, Daejeon (KR); Suwon Jee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 877 days.

(21) Appl. No.: 17/260,687

(22) PCT Filed: Apr. 29, 2020

(86) PCT No.: PCT/KR2020/005775
§ 371 (c)(1),
(2) Date: Jan. 15, 2021

(87) PCT Pub. No.: WO2020/251165
PCT Pub. Date: Dec. 17, 2020

(65) Prior Publication Data
US 2021/0328254 A1  Oct. 21, 2021

(30) Foreign Application Priority Data

Jun. 12, 2019  (KR) .................. 10-2019-0069056

(51) Int. Cl.
*H01M 10/058* (2010.01)
*H01M 10/052* (2010.01)
(Continued)

(52) U.S. Cl.
CPC ....... *H01M 10/058* (2013.01); *H01M 10/052* (2013.01); *H01M 10/446* (2013.01);
(Continued)

(58) Field of Classification Search
CPC ............. H01M 10/052; H01M 10/058; H01M 10/049; H01M 4/139; H01M 10/44; Y10T 29/49108
(Continued)

(56) References Cited

U.S. PATENT DOCUMENTS 9,588,183 B2  3/2017  Nakayama et al.
10,804,568 B2  10/2020  Hori
(Continued)

FOREIGN PATENT DOCUMENTS

CN  101606264 A  12/2009
JP  H10289729 A  10/1998
(Continued)

OTHER PUBLICATIONS

International Search Report for PCT/KR2020/005775 mailed Aug. 27, 2020; 3 pages.
(Continued)

*Primary Examiner* — Thiem D Phan
(74) *Attorney, Agent, or Firm* — Lerner David LLP

(57) ABSTRACT

The present disclosure relates to a method for manufacturing a lithium secondary battery comprising the steps of:
a) preparing an electrode assembly including a positive electrode, a negative electrode, and a separator interposed therebetween;
b) housing the electrode assembly in a battery case, injecting a non-aqueous electrolyte thereto and sealing the battery case to produce a preliminary battery;
c) activating the preliminary battery;
d) charging the activated preliminary battery to a SOC in a range of 25 to 35 to produce a secondary battery; and
e) subjecting the secondary battery to a high-temperature aging for 1 hour to 6 hours at a temperature range of 60° C. to 100° C., and a lithium secondary battery manufactured by the above manufacturing method.

15 Claims, 7 Drawing Sheets

(51) Int. Cl.
  *H01M 10/44* (2006.01)
  *H01M 10/52* (2006.01)
  *H01M 50/609* (2021.01)

(52) U.S. Cl.
  CPC ......... *H01M 10/52* (2013.01); *H01M 50/609* (2021.01); *Y10T 29/49108* (2015.01)

(58) Field of Classification Search
  USPC .................................. 29/623.1, 621, 623.5
  See application file for complete search history.

(56) References Cited

U.S. PATENT DOCUMENTS

| | | | |
|---|---|---|---|
| 2010/0313410 | A1 | 12/2010 | Min et al. |
| 2013/0316242 | A1 | 11/2013 | Matsuno et al. |
| 2015/0212162 | A1 | 7/2015 | Nakayama et al. |
| 2016/0268648 | A1 | 9/2016 | Ueno et al. |
| 2018/0164384 | A1 | 6/2018 | Kwon et al. |
| 2018/0309159 | A1 | 10/2018 | Hori |
| 2019/0237823 | A1 | 8/2019 | Lee et al. |
| 2019/0393509 | A1 * | 12/2019 | Lee .................. H01M 4/13 |

FOREIGN PATENT DOCUMENTS

| | | |
|---|---|---|
| JP | H11250930 A | 9/1999 |
| JP | 2012079561 A | 4/2012 |
| JP | 2015141772 A | 8/2015 |
| JP | 5930342 B2 | 6/2016 |
| JP | 6080017 B2 | 2/2017 |
| JP | 6094805 B2 | 3/2017 |
| KR | 20140139356 A | 12/2014 |
| KR | 20140139357 A | 12/2014 |
| KR | 20150015417 A | 2/2015 |
| KR | 20160038593 A | 4/2016 |
| KR | 101617415 B1 | 5/2016 |
| KR | 101692795 B1 | 1/2017 |
| KR | 2017-0061622 A | 6/2017 |
| KR | 20180090744 A | 8/2018 |
| KR | 20180119130 A | 11/2018 |
| KR | 2019-0028293 A | 3/2019 |
| WO | 2015068013 A1 | 5/2015 |

OTHER PUBLICATIONS

Extended European Search Report including Written Opinion for Application No. 20823620.8 dated Jun. 13, 2022, pp. 1-9.
Search Report dated Jan. 19, 2024 from Office Action for Chinese Application No. 202080003643.5 issued Jan. 21, 2024. 3 pgs.

* cited by examiner

MANUFACTURING METHOD OF LITHIUM SECONDARY BATTERY COMPRISING ADDITIONAL HEAT-TREATMENT PROCESS AND LITHIUM SECONDARY BATTERY MANUFACTURED BY THE SAME

CROSS-REFERENCE TO RELATED APPLICATIONS

The present application is a national phase entry under 35 U.S.C. § 371 of International Application No. PCT/KR2020/005775, filed on Apr. 29, 2020, which claims priority to Korean Patent Application No. 10-2019-0069056 filed on Jun. 12, 2019, the disclosures of which are incorporated herein by reference in their entirety.

TECHNICAL FIELD

The present disclosure relates to a manufacturing method of lithium secondary battery comprising additional heat-treatment process and a lithium secondary battery manufactured by the same.

BACKGROUND ART

Recently, interests on energy storage technologies are more increased. As the energy storage technologies are extended to cellular phones, camcorders and notebook PC, and further to electric vehicles, the demand for high-energy concentration of a battery used as a power source of such an electronic device is increased. A lithium ion secondary battery is a battery that can best meet these needs, and many studies are now in active progress.

The secondary battery may be classified into various types such as a pouch type, a prismatic type, a cylindrical shape, a small-sized type, and a medium to large-sized type according to an application form or a structure.

Basically, the secondary battery has a structure in which an electrode assembly is sealed in a battery case together with an electrolyte. Here, the electrode assembly includes a positive electrode, a negative electrode, and a separator interposed between the positive electrode and the negative electrode to electrically insulate the positive electrode and the negative electrode.

Such an electrode assembly may include a stack type electrode assembly that is stacked into a positive electrode/separator/negative electrode structure, a jelly-roll type electrode assembly having a structure wherein a long sheet type positive electrode and a long sheet type negative electrode are wound around a mandrel in the state in which a separator is disposed therebetween, and a stack-folding type electrode assembly having a structure wherein full cells where electrodes of mutually different polarities with positive electrode/separator/negative electrode structure are located at both ends, or bi-cells where electrodes of mutually identical polarities are located at both ends, similar to an positive electrode/separator/negative electrode/separator/positive electrode structure, are fabricated, positioned on a separator in extended sheet forms, and wound together. At this time, in order to more firmly couple the positive electrode, the separator and the negative electrode, generally, lamination is performed on a laminate.

However, considering the overall manufacturing processability of the secondary battery during the laminating process, as the lamination condition is stronger, it is better, but in terms of cell performance, if the lamination condition is too strong, the cell concentration polarization resistance increases, which causes a problem that the battery is rather degraded according to the cycle, so the processability and the cell performance conflict with each other.

That is, when the lamination is performed under strict conditions such as excessive pressure, a phenomenon of deterioration in life performance is found.

However, since it is difficult to change the material of a cell in a state of charge for shipping, there is a need to develop a method capable of improving the cell performance in a non-destructive manner despite strong lamination.

DETAILED DESCRIPTION OF THE INVENTION

Technical Problem

The present disclosure has been designed to solve the above-mentioned problems and other technical problems that have yet to be resolved.

As a result of repeated in-depth studies and various experiments, the inventors of the present application have found that by aging the secondary battery in a charged state at high temperature, the concentration polarization resistance in the secondary battery cell can be reduced, thus improving the life performance of the cell. The present disclosure has been completed on the basis of such findings.

Technical Solution

Therefore, one embodiment of the present disclosure provides a method for manufacturing a lithium secondary battery comprising the steps of:
  a) preparing an electrode assembly including a positive electrode, a negative electrode, and a separator interposed therebetween;
  b) housing the electrode assembly in a battery case, injecting a non-aqueous electrolyte thereto and sealing the battery case to produce a preliminary battery;
  c) activating the preliminary battery;
  d) charging the activated preliminary battery to a SOC in a range of 25 to 35 to produce a secondary battery; and
  e) subjecting the secondary battery to a high-temperature aging for 1 hour to 6 hours at a temperature range of 60° C. to 100° C.

In other words, as a result of repeated in-depth studies, the inventors of the present application have confirmed that the secondary battery having undergone all activation step and being in a shipping state is aged at high temperature once again, whereby the ion conductivity is improved through a deformation of the separator, which leads to a decrease in the discharge terminal OCV and suppresses an increase in resistance, thereby preventing deterioration of the battery and improving life characteristics, and have found that cell performance degradation due to strong lamination can be prevented in a non-destructive manner.

At this time, the high temperature aging of step e) may be performed for 1 hour to 5 hours, and more specifically for 1 hour to 3 hours.

When the aging is performed for a very short time, the effect intended by the present disclosure cannot be obtained. However, when the aging is performed for a very long time, the effect intended by the present disclosure can be achieved only by performing for 1 hour or more, and there is no significant difference, but it is not preferable because the process time is increased.

Therefore, the aging can be performed for 1 hour to 6 hours, and in consideration of the processability, it is more preferable that the aging is performed for 1 hour to 3 hours.

Meanwhile, the high temperature aging of step e) may be performed at the temperature range of 60° C. to 100° C. If it is lower than the above temperature, the time becomes too long, or it is not a temperature enough to deform the separator, so it is difficult to achieve the effect intended by the present disclosure. On the other hand, if the temperature is too high, it may affect even the active material and the like, and rather, the battery performance may be deteriorated, which is not preferable.

The most desirable temperature range capable of preventing the adverse effects on other configurations of other secondary batteries while achieving the effect of the present disclosure in a short time may be from 75° C. to 90° C.

In other words, even by subjecting the secondary battery having undergone activation step to a high-temperature aging in the state of SOC in the range of 25 to 35, which is a state of charge for shipping, the intended effects of the present disclosure can be achieved, and a degradation in battery performance that may occur due to strong lamination during the production of secondary batteries can be recovered in a non-destructive manner. Therefore, it can be said to be a useful method in which the problems that may appear during the production of secondary batteries can be resolved in a very simple manner.

On the other hand, before the preliminary battery is charged to a SOC in the range of 25 to 35 for shipping, activation can be performed.

The activation is a step of stabilizing the cell structure, and making it in an actually usable state, and may include steps such as charging/discharging, degassing, and battery failure detection. It is needless to say that the activation can be performed by a conventionally known method.

Meanwhile, specifically, the activation of step c) may include a step of charging and discharging the preliminary battery one or more times, and a step of degassing.

More specifically, the activation of step c) may be performed by including the following steps:
c1) primarily charging the preliminary battery;
c2) subjecting the primarily charged preliminary battery to a room-temperature aging at 23° C. to 27° C.;
c3) subjecting the battery to a primary high-temperature aging at 50° C. to 80° C. after step c2);
c4) subjecting the battery to a secondary room-temperature aging at 23° C. to 27° C. after step c3); and
c5) primarily discharging the preliminary battery after step c4);

The aging steps are performed for improving ion conductivity of the separator through sufficient impregnation of the electrolyte.

However, the degassing may also be performed by the above-mentioned aging step of leaving the preliminary battery.

According to the charging by the activation step, the electrode active material is activated and the decomposition of the electrolyte occurs, so that gas is generated inside the battery. Therefore, a step of removing these gases, that is, a degassing step is required. At this time, even by the aging step of leaving the preliminary battery, the generated gases can be considerably removed.

This is considered to be because in the process of charging the preliminary battery, various gases such as carbon monoxide (CO), hydrogen ($H_2$), carbon dioxide ($CO_2$), methane ($CH_4$), ethyne ($C_2H_2$), ethene ($C_2H_4$), propene ($C_3H_6$) and ethane ($C_2H_6$) are generated, and hydrogen ($H_2$) occupies most of the total volume of the total gas generated, so that it can be removed by combining with an unsaturated hydrocarbon such as ethene or propene on the electrode surface.

Meanwhile, the activation of step c) may further include an additional degassing step between steps c4) and c5).

Specifically, the additional degassing step may be performed by a step of opening the battery case of the sealed preliminary battery and re-sealing it when gas discharge is completed.

The opening includes full opening, and partial opening such as partial cutting, and gas discharge may be performed by creating a reduced pressure state or the like.

The primary charging of step c1) may be performed to a SOC in the range of 10 to 100, and in particular a SOC in the range of 25 to 35. This is considered to be because the initial charge for activation does not need to be fully charged, and even in the above range, a sufficiently stable passivation film can be formed to induce the generation of initial gas, and it is also desirable in terms of process efficiency.

Meanwhile, for the aging steps that is performed for stabilization of the passivation film formed by electrolyte impregnation, initial gas generation, and initial charging, specifically, the primary room-temperature aging of step c2) may be performed for 1 day to 5 days, and the primary high-temperature aging of step c3 for 10 hours to 30 hours, and the secondary room-temperature aging of step c4) for 10 hours to 30 days.

If each aging time is too short, deviating from the above range, the desired purpose cannot be achieved, and if the aging time is too long, side reactions such as corrosion may occur inside the battery and the efficiency of the process is reduced, which is not preferable.

When the aging step is completed, the preliminary battery performs a primary discharge, wherein the primary discharge is fully discharged up to around SOC 0.

The activation step may be performed by the processes of charging-aging-discharging as described above, and even after this step, additionally, c6) charging and discharging the preliminary battery may be repeated one or more times.

From this, the battery activation is performed more effectively, and additional charging and discharging can be fully charged and fully discharged.

This may be performed in order to confirm the performance of the battery after the passivation film is formed by the primary charging.

In the following, a method for manufacturing the preliminary battery of the present disclosure will be described in more detail.

The preliminary battery is manufactured by preparing an electrode assembly, housing the electrode assembly in a battery case, injecting a non-aqueous electrolyte thereto, and sealing the battery case.

At this time, the electrode assembly includes a positive electrode, a negative electrode, and a separator interposed therebetween.

In general, the positive electrode is manufactured by coating an positive electrode mixture including an electrode mixture, which is a mixture of an positive electrode active material, a conductive material, and a binder, onto an positive electrode current collector and the drying the electrode mixture, and if necessary, a filler may be further added to the mixture.

The positive electrode active material may be a layered compound such as lithium cobalt oxide ($LiCoO_2$) or lithium nickel oxide ($LiNiO_2$) or a compound substituted with one or more transition metals; lithium manganese oxides such as chemical formulae $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formulae $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); lithium-manganese composite oxide with spinel structure represented by chemical formula $LiNi_xMn_{2-x}O_4$; $LiMn_2O_4$ with a Li portion of chemical formula substituted with an alkaline earth metal ion; a disulfide compound; $Fe_2(MoO_4)_3$, and the like, but is not limited thereto.

The positive electrode current collector is typically formed to a thickness of 3 to 500 μm. The positive electrode current collector is not particularly limited as long as a corresponding battery has high conductivity while a chemical change is not caused in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is typically added in an amount of 1 to 30% by weight based on the total weight of the mixture containing the positive electrode active material. The conductive material is not particularly limited as long as a corresponding battery has high conductivity while a chemical change is not caused in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used. Specific examples of a commercially available conductive material may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive material and in the binding with the current collector, wherein the binder may typically be added in an amount of 1 to 30% by weight based on the total weight of the mixture containing the positive electrode material. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The filler may be optionally used as a component for suppressing expansion of a positive electrode, and is not particularly limited as long as the filler is a fibrous material while a chemical change is not caused in the battery. For example, olefinic polymers such as polyethylene and polypropylene, and fibrous materials such as glass fibers and carbon fibers are used.

The negative electrode is manufactured by coating, drying and pressing the negative electrode active material onto a negative electrode current collector, and if necessary, may optionally and further include the above-mentioned conductive material, binder, filler and the like.

The negative electrode active material may include one or more carbon-based materials selected from the group consisting of artificial crystalline graphite, natural crystalline graphite, amorphous hard carbon, low-crystalline soft carbon, carbon black, acetylene black, Ketjen black, Super-P, graphene and fibrous carbon, Si-based materials, metal composite oxides such as $Li_xFe_2O_3 (0 \le x \le 1)$, $Li_xWO_2$ ($0 \le x \le 1$), $Sn_xMe_{1-x}Me'_yO_z$ (Me: Mn, Fe, Pb, Ge; Me': Al, B, P, Si, Group 1, 2, 3 elements in the periodic table, halogen; $0 < x \le 1$; $1 \le y \le 3$; $1 \le z \le 8$); lithium metals; lithium alloys; silicon-based alloys; tin-based alloys; metal-based oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; a conductive polymer such as polyacetylene; Li—Co—Ni based materials; titanium oxide; lithium titanium oxide, and the like, but are not limited thereto.

The negative electrode current collector is typically formed to a thickness of 3 to 500 μm. The negative electrode current collector is not particularly limited as long as a corresponding battery has high conductivity while a chemical change is not caused in the battery, and for example, may be formed of copper, stainless steel, aluminum, nickel, titanium, or baked carbon, or a material formed by surface-treating g a surface of copper or stainless steel with carbon, nickel, titanium, silver, or the like, or may use an aluminum-cadmium alloy or the like. In addition, similar to the positive electrode current collector, the negative electrode current collector may have fine protrusions and depressions formed on a surface thereof to enhance adherence of a negative electrode active material, and may be formed in various forms such as a film, a sheet, a foil, a net, a porous body, a foaming body, and a non-woven fabric structure.

The separator is preferably interposed between the negative electrode and the positive electrode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin-based polymer such as polypropylene; glass fiber or polyethylene, which have chemical resistance and hydrophobicity, are used. When a solid electrolyte such as a polymer is employed as the electrolyte, the solid electrolyte may also serve as both the separator and electrolyte.

The electrode assembly having such a configuration may be a stack type electrode assembly in which layers are sequentially stacked in the order of a positive electrode/separator/negative electrode . . . , or a jelly-roll type electrode assembly having a structure wherein negative electrodes and positive electrodes are wound by interposing a separator therebetween, or a stack-folding type electrode assembly having a structure wherein bi-cells and and/or full cells are fabricated and wound into a separation film, as described above.

However, the present disclosure can be more preferably applied to a laminated electrode assembly because the battery performance does not deteriorate even when the laminating strength is increased.

For example, it can be applied to the stack type electrode assembly and the stack-folding type electrode assembly. In the case of the stack type electrode assembly, it may be a shape in which the positive electrode, the separator, and the negative electrode may be stacked individually one by one, but may also be a shape in which bi-cells and full-cells are fabricated and stacked to form the above structure.

Therefore, lamination may be performed for the entire stack type electrode assembly, and it may also be performed for individual bi-cells or full cells used in a stack type or stack-folding type electrode assembly. Therefore, the laminate of the positive electrode, the negative electrode, and the separator described below is a concept encompassing all of the entire stack type electrode assembly, bi-cells, or full cells.

At this time, lamination may be performed by pressing a laminate of the positive electrode, the negative electrode and the separator at a linear pressure of 1 kgf/mm to 5 kgf/mm. That is, manufacturing the electrode assembly may include laminating the laminate in the above pressure range.

As such, despite the high-strength lamination, when high-temperature aging is performed once again on the secondary battery in the state of shipping and charging according to the manufacturing method of the present disclosure, it is possible to reduce the concentration polarization resistance in the cell caused by lamination. Thus, since it is possible to prevent degradation of cell performance with high processability through lamination, it is possible to manufacture a secondary battery regardless of the lamination strength.

Meanwhile, the electrode assembly manufactured as described above is housed in a battery case together with a non-aqueous electrolyte.

The non-aqueous electrolyte is composed of a liquid electrolyte and a lithium salt, and a non-aqueous organic solvent is used as the liquid electrolyte.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoro-ethylene carbonate (FEC), propene sultone (PRS), fluoro-ethylene carbonate (FEC), and the like.

Meanwhile, according to the present disclosure, there is provided a lithium secondary battery manufactured by the above manufacturing method, wherein the lithium secondary battery can be a secondary battery in which a degradation mode for the negative electrode capacity loss is removed.

Specifically, the negative electrode capacity loss generally appears as Li plating is deposited on the negative electrode surface. However, according to the present disclosure, the deposition of lithium is significantly reduced by the high-temperature aging, so that degradation caused by the negative electrode capacity loss does not appear.

At this time, the degradation of the negative electrode capacity loss is determined by performing a process in which the manufactured secondary battery is charged/discharged at a low rate of 0.05 C (charge/discharge equipment from PNE Solution Co., Ltd.), the resistance of the cell required during charging/discharging is minimized to see that there is no resistance, and the voltage profile therefor can be differentiated and measured by BOL/MOL VOLCANO analysis method to obtain information on positive electrode/negative electrode.

More specifically, BOL is that measured at low rate once in the process of confirming the state of the initial cell as the state before evaluating cycle characteristics, and MOL is that measured at a low rate in a state after the cycle has progressed to a certain level. The data obtained can be used to differentiate, and the BOL and MOL states are compared to determine the degradation of the negative electrode capacity loss.

When determined by the above method, in the secondary battery manufactured according to the present disclosure, a degradation due to the negative electrode capacity loss is removed, and consequently, it is possible to prevent deterioration of life characteristics.

DETAILED DESCRIPTION OF THE EMBODIMENTS

Hereinafter, the present disclosure will be described in more detail with reference to examples, but these examples are provided for illustrative purposes only, and should not be construed as limiting the scope of the present disclosure.

Experimental Example 1

A separator (DB0901, BAI SRS composition, thickness: 18 μm, cloth 9 μm, total coating thickness of 9 μm, coated at a thickness of 4.5 μm per one surface of SRS) was prepared by punching in a size of 5 cm×5 cm. 300 ul of a non-aqueous electrolyte containing 1M $LiPF_6$ as a lithium salt, in which ethyl carbonate, dimethyl carbonate and ethyl methyl carbonate were mixed at a volume ratio of 1:1:1, was sprayed on the separator, completely wetted, and then vacuum-packed in each pouch.

Thereafter, the temperature of the chamber was set to 80° C., and then stored for 1 hour, 3 hours, and 6 hours in compliance with each time. In addition, a separator without heat treatment was prepared.

Next, the pouch was taken out at room temperature, opened, washed with DMC to remove the salt of the electrolyte adhering to the separator, and then dried in a dryer for 12 hours.

The air permeability of the dried separator was measured, and shown in FIG. 1 below.

The air permeability was measured using an air permeability measuring device (Model EG01-55-1MR) manufactured by ASAHI SEIKO.

Experimental Example 2

The separators prepared in Experimental Example 1 (high-temperature treated) were punched into a size of 19 pi, placed in the bottom plate of 2032 coin cell (Lotech), and fixed with a gasket, to which 80 ul of the electrolyte of Experimental Example 1 was injected, and then sus and spring were loaded in order, covered with a top plate of the coin cell, and clamped to produce a coin cell. Then, the ion conductivity of the coin cell was measured using EIS equipment (Biologic), and the obtained x-intercept value was used. to calculate the ionic conductivity, and the results are shown in FIG. 2 below.

Figure 1:
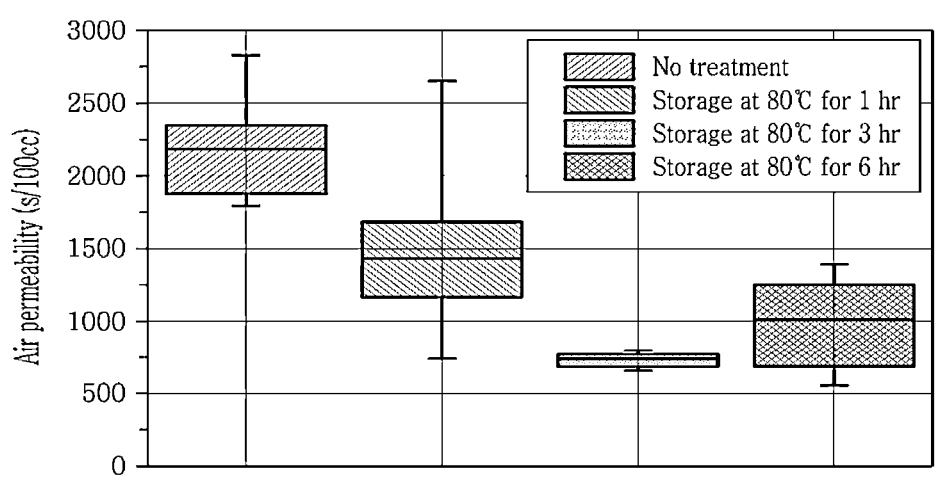
FIG. 1 is a graph showing an air permeability of the separator according to Experimental Example 1.
Figure 2:
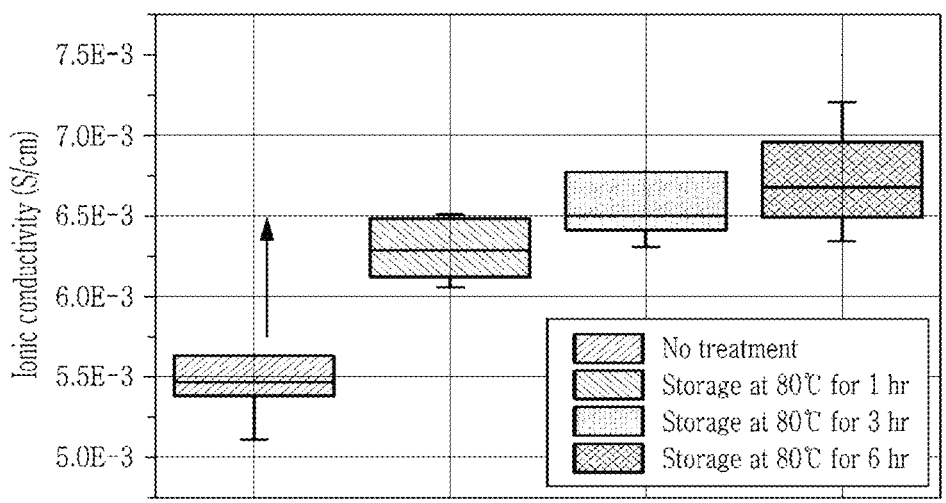
FIG. 2 is a graph showing an ion conductivity according to Experimental Example 2.

In FIGS. 1 and 2 below, the area occupied by each graph represents the dispersion of the values at the entire position of the separator, and the middle line represents the average.

Referring to FIGS. 1 to 2, it can be confirmed that the separator not subjected to high-temperature storage and the separator subjected to high-temperature storage show a clear difference in air permeability and ionic conductivity.

This is expected to be due to a deformation of the binder interposed in the separator.

Further, storing for 3 hours or 6 hours is more preferable as compared with storing for 1 hour, but it can be confirmed that 3 hours or 6 hours show similar values. Therefore, it can be seen that not only it can exhibit effects during storage for 1 hour, but also it can exhibit sufficient effects during storage for about 3 hours.

Preparation Example

Manufacture of Positive Electrode $0.5Li_2MnO_3 \cdot 0.5Li(Ni_{0.45}Mn_{0.35}Ni_{0.20})O_2$ was used as the positive electrode active material, and the conductive material (carbon black) and the binder (PVdF) were added in a weight ratio of 90:5:4 to NMP(N-methyl-2-pyrrolidone), and mixed to prepare a positive electrode mixture.

The prepared positive electrode mixture was coated onto a 20 μm thick aluminum foil to a thickness of 80 μm, then rolled and dried to manufacture a positive electrode.

Manufacture of Negative Electrode

Artificial graphite was used as the positive electrode, and the conductive material (carbon black), the conductive material (carbon black) and the binder (PVdF) were added in a weight ratio of 95:3:2 to NMP(N-methyl-2-pyrrolidone) and mixed to prepare a negative electrode mixture.

The prepared negative electrode mixture was coated onto a 20 μm thick copper foil to a thickness of 80 μm, then rolled and dried to manufacture a negative electrode.

Manufacture of Preliminary Battery

A separator (DB0901, BA1 SRS composition, thickness: 18 μm, cloth 9 μm, total coating thickness of 9 μm, coated to a thickness of 4.5 μm per one surface of SRS) was interposed between the positive electrode and the negative electrode, and laminated at a linear pressure of 1 kgf/mm to manufacture an electrode assembly. The electrode assembly was then housed in a pouch-type battery case, and a non-aqueous electrolyte, in which ethyl carbonate, dimethyl carbonate, and ethyl methyl carbonate were mixed at a volume ratio of 1:1:1 and 1M $LiPF_6$ was contained as lithium salt, was added thereto to manufacture a pouch type lithium secondary battery as a preliminary battery.

Activation Process

The preliminary battery prepared above was subjected to a primary charging step to SOC 30, and then subjected to a room-temperature aging for 3 days at a temperature of 25° C., a high-temperature aging for 24 hours at a temperature of 60° C., and again a room-temperature aging for 20 days at a temperature of 25° C., and then a part of the pouch-type case was opened, degassed and then primarily discharged to SOC 0.

Subsequently, the process of charging up to SOC 100 and discharging up to SOC 0 was repeated twice more, thereby completing the activation process.

Example 1

The activated preliminary battery of the Preparation Example was charged up to SOC 30 which is a shipping state to manufacture a secondary battery, which was subjected to a high-temperature aging at a temperature of 80° C. for 1 hour.

Example 2

The activated preliminary battery of the Preparation Example was charged up to SOC 30 which is a shipping state to manufacture a secondary battery, which was subjected to a high-temperature aging at a temperature of 80° C. for 3 hours.

Example 3

The activated preliminary battery of the Preparation Example was charged up to SOC 30 which is a shipping state to manufacture a secondary battery, which was subjected to a high-temperature aging at a temperature of 80° C. for 6 hours.

Comparative Example 1

The activated preliminary battery of the Preparation Example was charged up to SOC 30 which is a shipping state to manufacture a secondary battery, and no separate treatment was performed.

Experimental Example 3

Cycle characteristics were evaluated for the secondary batteries manufactured in Examples 1 to 3 and Comparative Examples 1, respectively.

For evaluation of cycle characteristics, the capacity retention rate according to cycle, OCV change at the voltage ($E_0D$) maintained during the rest after discharge, and the resistance increase rate were measured, and the process of charging the secondary battery at 0.33C/4.2V and discharging it at 0.33C/2.5V was repeated 100 times, and measured.

Figure 3:
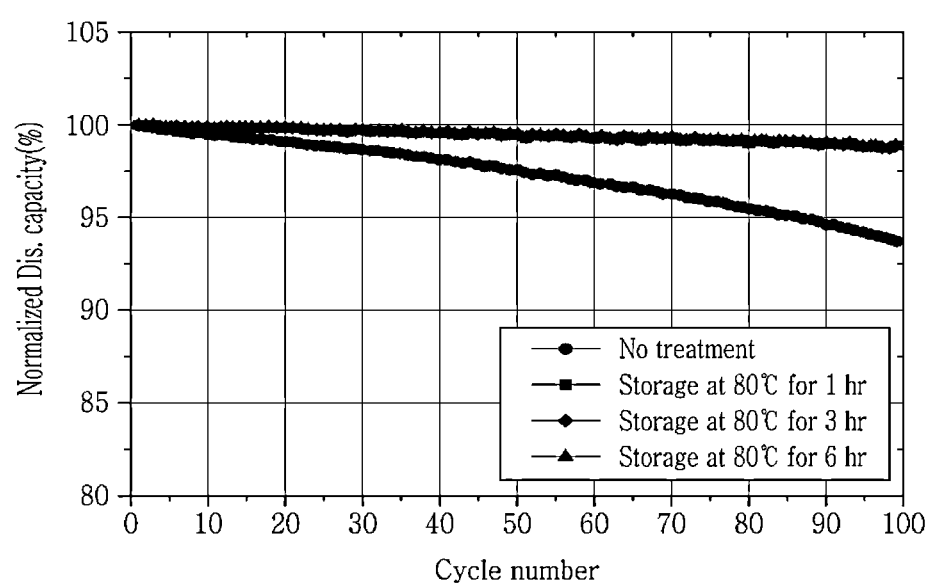
FIGS. 3 to 5 are graphs showing a cycle characteristic according to Experimental Example 3.
Figure 4:
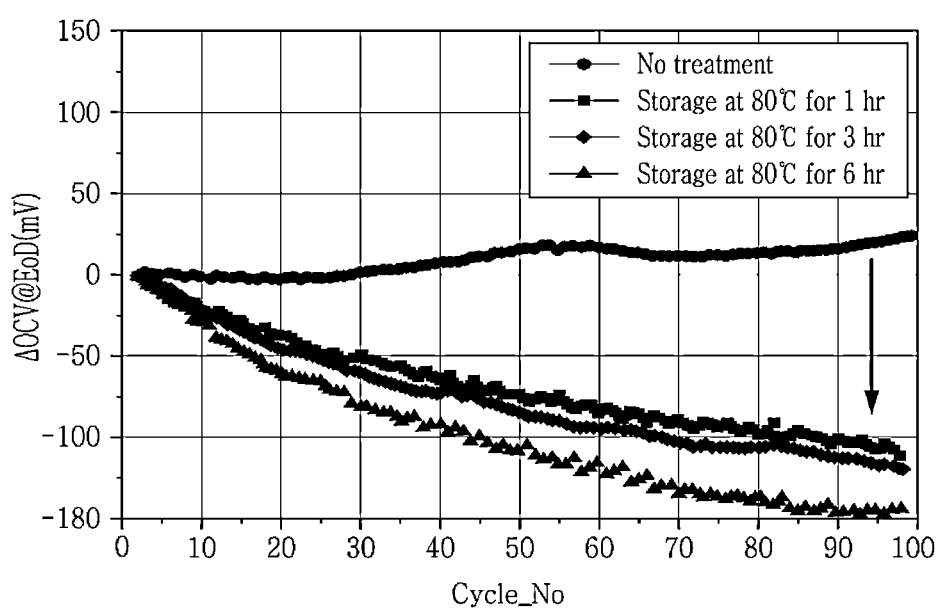
Figure 5:
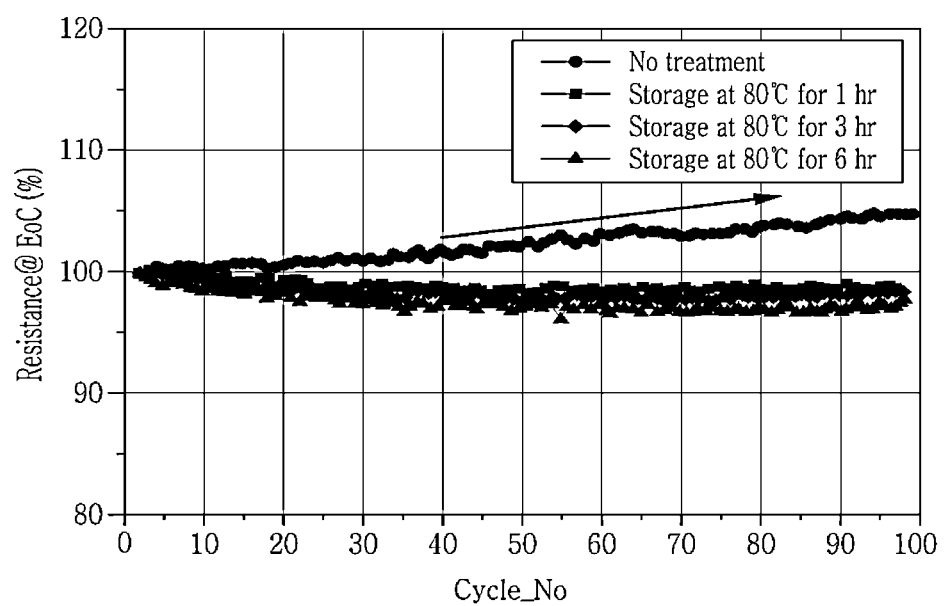

The results are shown in FIGS. 3 to 5 below.

Considering FIGS. 3 to 5, it can be confirmed that when subjected to the high-temperature aging according to the present disclosure, the life characteristics were significantly improved as compared with the case where it was not. In FIG. 3, the graph of Example 1 is hidden by the graphs of Examples 2 and 3 and is not visible.

On the other hand, it is needless to say that it shows a difference in the OCV value, but practically, in case of storage for 1 to 6 hours in terms of capacity retention rate or resistance increase according to cycle, it can be confirmed that it does not show a significant difference.

Therefore, it can be confirmed that the effect of the present disclosure can be achieved even with an aging time of about 1 hour.

Experimental Example 4

Figure 6:
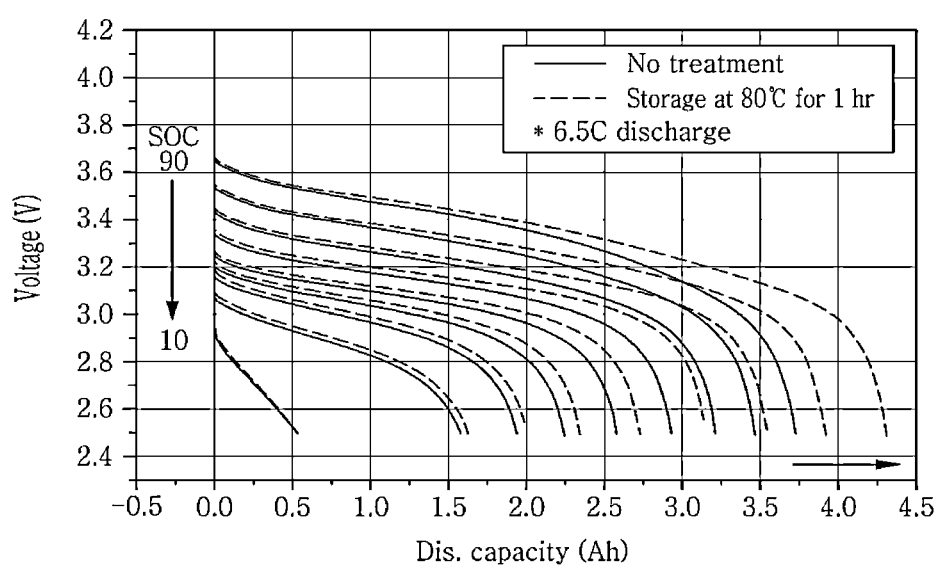
FIG. 6 is a graph of a discharge capacity that can confirm the concentration polarization resistance in the SOC section according to Experimental Example 4.

While discharging the secondary battery manufactured in Example 3 and Comparative Example 1 to 6.5C for 1 minute for each section changing by 10 from SOC 90 to SOC 10, the change in discharge capacity was measured to confirm the difference in concentration polarization resistance, and the results are shown in FIG. 6 below.

Referring to FIG. 6, when the high-temperature aging was performed, it can be confirmed that it exhibits a high discharge capacity. This is considered to be because the ionic conductivity of the separator was improved and the concentration polarization resistance was reduced, as set forth in Experimental Example 1.

Experimental Example 5

Figure 7:
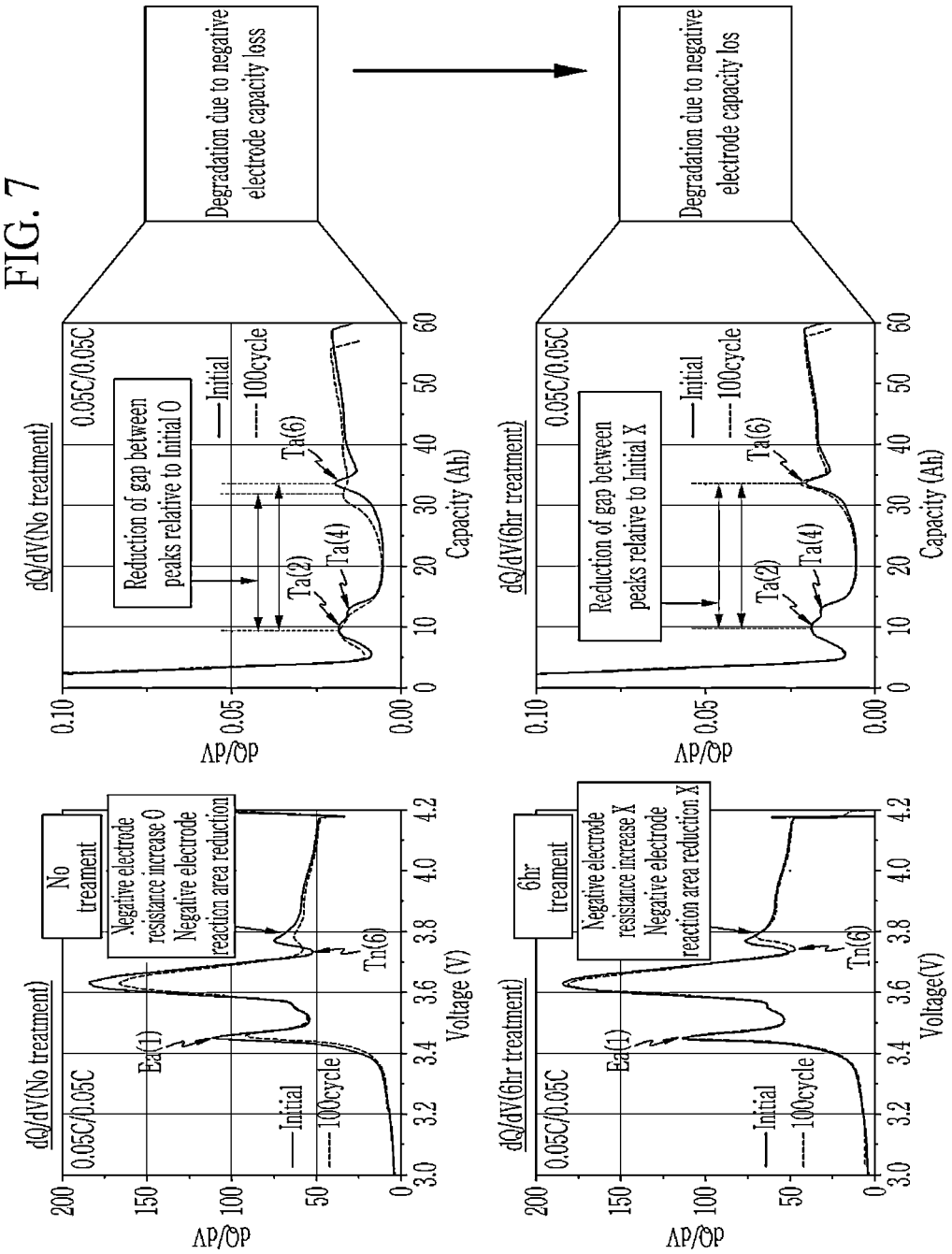
FIG. 7 is a graph that can confirm the degradation behavior of the negative electrode capacity loss according to Experimental Example 5.

For the secondary battery manufactured in Example 3 and Comparative Example 1, the process of charging up to 0.05C at 4.2V and discharging up to 0.05C at 2.5V was performed 100 times, the dQ/dV value at initial charge for the voltage and the capacity and the dQ/dV value at 100 cycles were respectively compared, and it was confirmed whether the degradation behavior was visible for the negative electrode capacity loss, and this is shown in FIG. 7.

Referring to FIG. 7, in the case of a secondary battery that has not undergone the high-temperature aging, when the dQ/dV graphs for initial and 100 cycle voltages were overlaid and compared, it was confirmed that Ta(6) indicated in the graphs; the peaks expressed at the negative electrode were randomly named in order; the peaks were shifted to the right. This is interpreted as an increase in the negative electrode resistance, which means a decrease in the reaction area of the negative electrode. In addition, when looking at the dV/dQ graph for the capacity, it shows a decrease in the interval between peaks compared to the initial, which is interpreted that the total capacity is degraded due to the negative electrode capacity loss.

On the other hand, when the high-temperature treatment was performed, the graph of initial and 100 cycles shows that there is almost no peak intensity or shift of Ta(6) at dQ/dV compared to the voltage, so that the negative electrode resistance increase is slight, and thus there is almost no decrease in the negative electrode reaction area. Moreover, since there is almost no decrease in the interval of the initial ratio peak in the capacity ratio dV/dQ graph, it is judged that there is no degradation in total capacity.

Based on the above disclosure, this is to be understood by those of ordinary skill in the art that various applications and modifications can be made within the scope of the present disclosure.

The invention claimed is:

1. A method for manufacturing a lithium secondary battery comprising:
   a) preparing an electrode assembly including a positive electrode, a negative electrode, and a separator interposed therebetween;
   b) housing the electrode assembly in a battery case, injecting a non-aqueous electrolyte thereto and sealing the battery case to produce a preliminary battery;
   c) activating the preliminary battery;
   d) charging the activated preliminary battery to a SOC in a range of 25 to 35 to produce a secondary battery; and
   e) subjecting the secondary battery to a high-temperature aging for 1 hour to 6 hours at a temperature range of 60° C. to 100° C.,
   wherein the activation c) is performed by a process including:
   c1) primarily charging the preliminary battery;
   c2) subjecting the primarily charged preliminary battery to a primary room-temperature aging;
   c3) subjecting the preliminary battery to a primary high-temperature aging after c2);
   c4) subjecting the preliminary battery to a secondary room-temperature aging after c3); and
   c5) primarily discharging the preliminary battery after c4).

2. The method for manufacturing a lithium secondary battery according to claim 1,
   wherein the high-temperature aging e) is performed for 1 hour to 3 hours.

3. The method for manufacturing a lithium secondary battery according to claim 1,
   wherein the high-temperature aging e) is performed for 1 hour to 3 hours at a temperature range of 75° C. to 90° C.

4. The method for manufacturing a lithium secondary battery according to claim 1,
   wherein the activation c) further includes degassing.

5. The method for manufacturing a lithium secondary battery according to claim 4,
   wherein the degassing is performed by the aging.

6. The method for manufacturing a lithium secondary battery according to claim 1,
   wherein
   the primary room-temperature aging is performed at 23° C. to 27° C.,
   wherein the-primary high-temperature aging of c3) is performed at 50° C. to 80° C., and
   wherein the-secondary room-temperature aging of c4) is performed at 23° C. to 27° C.

7. The method for manufacturing a lithium secondary battery according to claim 6,
   wherein the activation c) further comprises an additional degassing process between c4) and c5).

8. The method for manufacturing a lithium secondary battery according to claim 7,
wherein the additional degassing comprises opening the battery case of the sealed preliminary battery and re-sealing it.

9. The method for manufacturing a lithium secondary battery according to claim 6, further comprising: c6) charging and discharging the preliminary battery one or more times, after c5).

10. The method for manufacturing a lithium secondary battery according to claim 9, wherein the charging and discharging c6) are fully charging and fully discharging.

11. The method for manufacturing a lithium secondary battery according to claim 6, wherein the primary charging c1) is performed to SOC in the range of 0 to 100.

12. The method for manufacturing a lithium secondary battery according to claim 6, wherein the primary room-temperature aging c2) is performed for 1 day to 5 days, the primary high-temperature aging c3) for 10 hours to 30 hours, and the secondary room-temperature aging c4) for 10 hours to 30 days.

13. The method for manufacturing a lithium secondary battery according to claim 6, wherein the primarily discharging c5) is fully discharging.

14. The method for manufacturing a lithium secondary battery according to claim 1,
wherein the electrode assembly is manufactured by laminating a laminate of the positive electrode, the negative electrode and the separator under a pressure of 1 kgf/mm to 5 kgf/mm.

15. A lithium secondary battery manufactured by the manufacturing method according to claim, 1, in which the lithium secondary battery is a secondary battery in which a degradation mode for a negative electrode capacity loss is removed.

* * * * *